(12) United States Patent
Kim

(10) Patent No.: US 10,776,064 B2
(45) Date of Patent: Sep. 15, 2020

(54) DISPLAY DEVICE

(71) Applicant: Samsung Display Co., Ltd., Yongin-si (KR)

(72) Inventor: Yeon Cu Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/102,615

(22) Filed: Aug. 13, 2018

(65) Prior Publication Data

US 2019/0102133 A1 Apr. 4, 2019

(30) Foreign Application Priority Data

Sep. 29, 2017 (KR) .................. 10-2017-0127701

(51) Int. Cl.
| | |
|---|---|
| *G09G 5/10* | (2006.01) |
| *G09G 5/02* | (2006.01) |
| *G09G 3/36* | (2006.01) |
| *G06F 3/14* | (2006.01) |
| *G02F 1/1362* | (2006.01) |
| *G02F 1/133* | (2006.01) |
| *G02F 1/1333* | (2006.01) |
| *G02F 1/1335* | (2006.01) |

(52) U.S. Cl.
CPC ........ *G06F 3/1446* (2013.01); *G02F 1/13306* (2013.01); *G02F 1/13336* (2013.01); *G02F 1/133514* (2013.01); *G02F 1/136286* (2013.01); *G09G 3/3607* (2013.01); *G02F 2201/121* (2013.01); *G02F 2201/123* (2013.01); *G02F 2201/52* (2013.01); *G09G 2300/026* (2013.01); *G09G 2300/0452* (2013.01); *G09G 2310/0232* (2013.01)

(58) Field of Classification Search
CPC ....................................................... G09G 3/32
See application file for complete search history.

(56) References Cited

U.S. PATENT DOCUMENTS

| | | | |
|---|---|---|---|
| 6,014,121 A * | 1/2000 | Aratani ................ | G06T 3/4015 345/89 |
| 2013/0027439 A1* | 1/2013 | Kim ...................... | G09G 3/003 345/690 |

(Continued)

FOREIGN PATENT DOCUMENTS

KR 10-2011-0045484 5/2011

*Primary Examiner* — Nan-Ying Yang
(74) *Attorney, Agent, or Firm* — H.C. Park & Associates, PLC

(57) ABSTRACT

A video wall-type display device may include: a plurality of display modules, each including: a display area including: a first sub-area; and at least one second sub-area disposed to adjoin and to surround the first sub-area; and a non-display area disposed to surround the display area, wherein the first sub-area may include at least one first pixel unit. The at least one first pixel unit includes: a first pixel configured to display a first color; a second pixel configured to display a second color; and a third pixel configured to display a third colors, the first, second, and third colors being different from each another. The second sub-area may include at least one second pixel unit, the at least one second pixel unit including: the first pixel, the second pixel, and the third pixel; and at least one fourth pixel configured to display a white color.

22 Claims, 10 Drawing Sheets

(56) References Cited

U.S. PATENT DOCUMENTS

2014/0211103 A1* 7/2014 Baek ................ G02F 1/133753
 349/12
2016/0055821 A1* 2/2016 Phan ................ G02F 1/133514
 345/592
2016/0178940 A1* 6/2016 Yuan ................ G02F 1/133514
 359/893
2016/0366379 A1* 12/2016 Hickl ....................... G02B 3/08

* cited by examiner

US 10,776,064 B2

DISPLAY DEVICE

CROSS REFERENCE TO RELATED APPLICATION

This application claims priority from and the benefit of Korean Patent Application No. 10-2017-0127701, filed on Sep. 29, 2017, which is hereby incorporated by reference for all purposes as if fully set forth herein.

BACKGROUND

Field

Exemplary embodiments of the invention relate generally to a display device and, more specifically, to a video wall-type display device with reduced or minimized width of non-display area.

Discussion of the Background

With the advent of the information era, various display devices for displaying an image have emerged as information devices. A liquid crystal display (LCD) device, which is one of the most widely-used flat panel displays, includes two substrates on which field-generating electrodes such as pixel electrodes and a common electrode are formed and a liquid crystal layer which is interposed between the two substrates. The LCD forms an electric field in the liquid crystal layer by applying voltages to the field-generating electrodes to determine the orientation of liquid crystal molecules in the liquid crystal layer and displays an image by controlling the polarization of light incident thereupon using the electric field.

In the meantime, large-sized displays are needed in places such as stadiums, concert halls, shopping malls, and the like where many people gather. However, it is difficult to manufacture large-sized displays as single products because of processing and manufacturing cost problems. Thus, to realize a large-sized display, a video wall capable of displaying a single screen by combining multiple display modules has been developed.

However, a conventional video wall-type display device including a plurality of display modules placed to overlap with one another to display a single image, but may have a problem in that that the bezel of each of the display modules may be viewed as a black band in areas where the display modules overlap with one another.

The above information disclosed in this Background section is only for understanding of the background of the inventive concepts, and, therefore, it may contain information that does not constitute prior art.

SUMMARY

Devices constructed according to exemplary embodiments of the invention discloses a display device having a reduced or minimized width of a bezel area between display modules recognizable to a user.

According to one or more embodiments of the invention, a video wall-type display device may include: a plurality of display modules, each of the display modules including: a display area including: a first sub-area; and at least one second sub-area disposed to adjoin and to surround the first sub-area; and a non-display area disposed to surround the display area, wherein the first sub-area may include at least one first pixel unit, the at least one first pixel unit including: a first pixel configured to display a first color; a second pixel configured to display a second color; and a third pixel configured to display a third colors, the first, second, and third colors being different from each another, and wherein the second sub-area may include at least one second pixel unit, the at least one second pixel unit including: the first pixel, the second pixel, and the third pixel; and at least one fourth pixel configured to display a white color.

The at least one fourth pixel of the at least one second pixel unit may be disposed to adjoin the non-display area.

The at least one fourth pixel of the at least one second pixel unit may be disposed between the first pixel, the second pixel, and the third pixel of the at least one second pixel unit and the non-display area.

Each of the first pixel, the second pixel, and the third pixel of the at least one first pixel unit may include two sub-pixels, which display different brightness, respectively.

The first pixel, the second pixel, and the third pixel of the at least one second pixel unit may be configured to display the same brightness.

According to one or more exemplary embodiments of the invention, a video wall-type display device may include: a plurality of display modules, each of the display modules including: a display area configured to display an image; and a non-display area disposed to surround the display area, wherein the display area may include: a first sub-area including at least one first pixel unit; a second sub-area including at least one second pixel unit disposed to adjoin a lower side of the first sub-area; a third sub-area including at least one third pixel unit disposed to adjoin a left side of the first sub-area; a fourth sub-area including at least one fourth pixel unit disposed to adjoin a right side of the first sub-area; and a fifth sub-area including at least one fifth pixel unit disposed to adjoin an upper side of the first sub-area, wherein the at least one first pixel unit may include: a first pixel configured to display a first color; a second pixel configured to display a second color; and a third pixel configured to display a third color, the first, second, and third colors being different from one another, and wherein each of the at least one second pixel unit, the at least one third pixel unit, the at least one fourth pixel unit, and the at least one fifth pixel unit may include: the first pixel, the second pixel, and the third pixel; and at least one fourth pixel configured to display a white color.

The at least one fourth pixel may be disposed to adjoin a lower side of the second sub-area, a left side of the third sub-area, a right side of the fourth sub-area, and an upper side of the fifth sub-area.

The first pixel, the second pixel, and the third pixel of the at least one first pixel unit may be arranged in two rows and three columns, and wherein the first pixel, the second pixel, the third pixel, and the fourth pixel of the at least one second pixel unit, the at least one third pixel unit, the at least one fourth pixel unit, and the at least one fifth pixel unit may be arranged in two rows and three columns.

The first pixel, the second pixel, and the third pixel of the at least one second pixel unit may be sequentially arranged in a first row, and wherein the at least one fourth pixel of the at least one second pixel unit may be sequentially arranged in a second row.

The at least one fourth pixel of the at least one second pixel unit may have the same brightness as the first pixel, the second pixel, and the third pixel disposed in their respective columns.

The at least one third pixel unit, the at least one fourth pixel of the at least one third pixel unit may be sequentially disposed in a first column, and wherein the first pixel, the second pixel, and the third pixel of the at least one third pixel unit may be disposed in second and third columns.

The at least one fourth pixel of the at least one third pixel unit may have the same brightness as the first pixel, the second pixel, and the third pixel adjoined to them in their respective rows.

The first pixel, the second pixel, and the third pixel of the at least one fourth pixel unit may be disposed in first and second columns, and wherein the at least one fourth pixel of the at least one fourth pixel unit may be sequentially disposed in a third column.

The at least one fourth pixel of the at least one fifth pixel unit may be sequentially disposed in a first row, and wherein the first pixel, the second pixel, and the third pixel of the at least one fifth pixel unit may be disposed in a second row.

Areas occupied by the first pixel, the second pixel, the third pixel, and the fourth pixel disposed in the first row of each of the at least one first pixel unit, the at least one second pixel unit, the at least one third pixel unit, and the at least one fourth pixel unit may be larger than areas occupied by the first pixel, the second pixel, the third pixel, and the fourth pixel disposed in the second row of each of the at least one first pixel unit, the at least one second pixel unit, the at least one third pixel unit, and the at least one fourth pixel unit, respectively.

Areas occupied by the first pixel, the second pixel, the third pixel, and the fourth pixel disposed in the first row of the at least one fifth pixel unit may be smaller than areas occupied by the first pixel, the second pixel, the third pixel, and the fourth pixel disposed in the second row of the at least one fifth pixel unit, respectively.

Each of the first pixel, the second pixel, and the third pixel of the at least one first pixel unit may include two sub-pixels, which display different brightness.

Each of the first pixel, the second pixel, and the third pixel of each of the at least one second pixel unit, the at least one third pixel unit, the at least one fourth pixel unit, and the at least one fifth pixel unit may include at least one sub-pixel, which displays a single brightness.

The first color may be a red color, the second color may be a green color, and the third color may be a blue color.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
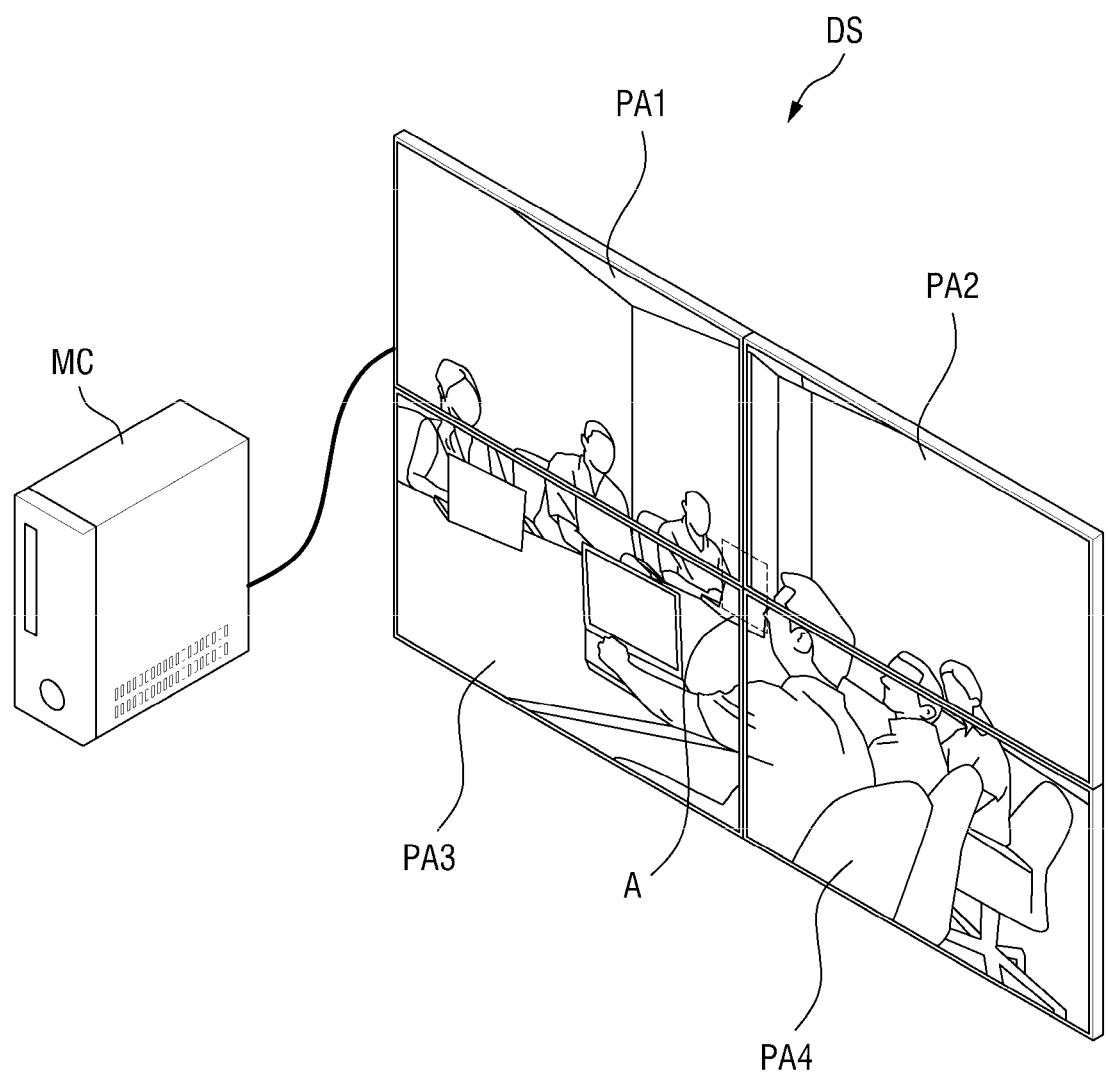
FIG. 1 is a schematic view illustrating a video wall-type display device according to an exemplary embodiment of the present invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a schematic view illustrating a video wall-type display device according to an exemplary embodiment.

Referring to FIG. 1, a video wall-type display device DS includes a plurality of display modules PA1, PA2, PA3, and PA4 and an external device MC.

Each of the display modules PA1, PA2, PA3, and PA4 may be connected to the external device MC and may display a video wall image IM based on an image signal received from the external device MC. Each of the display modules PA1, PA2, PA3, and PA4 may display part of the video wall image IM by processing a received image signal based on location information, which indicates the relative location of each of the display modules PA1, PA2, PA3, and PA4, and an image signal generated by the external device MC may be provided in parallel and/or in sequence to the display modules PA1, PA2, PA3, and PA4 connected to the external device MC.

FIG. 1 illustrates an example in which the display modules PA1, PA2, PA3, and PA4 receive an image signal from the external device MC, but the present disclosure is not limited thereto. That is, in another example, one of the display modules PA1, PA2, PA3, and PA4 may receive a broadcast signal and may transmit an image signal in parallel and/or in sequence to the other display modules, and each of the display modules PA1, PA2, PA3, and PA4 may display part of a video wall image based on the location information and the image signal.

The configuration of the video wall-type display device DS, particularly, the number of display modules of the video wall-type display device DS and the arrangement of the display modules, are not particularly limited. The video wall-type display device DS may have various arrangements of the display modules PA1, PA2, PA3, and PA4 in accordance with the video wall image IM, and the arrangement of the display modules PA1, PA2, PA3, and PA4 is not particularly limited as long as the display modules PA1, PA2, PA3, and PA4 are connected in parallel and/or in sequence.

The structure of the display modules PA1, PA2, PA3, and PA4 of the video wall-type display device DS will hereinafter be described. Specifically, since the display modules PA1, PA2, PA3, and PA4 have substantially the same structure, the structure of the display modules PA1, PA2, PA3, and PA4 will hereinafter be described, taking one of the display modules PA1, PA2, PA3, and PA4, particularly, the display module PA1.

Figure 2:
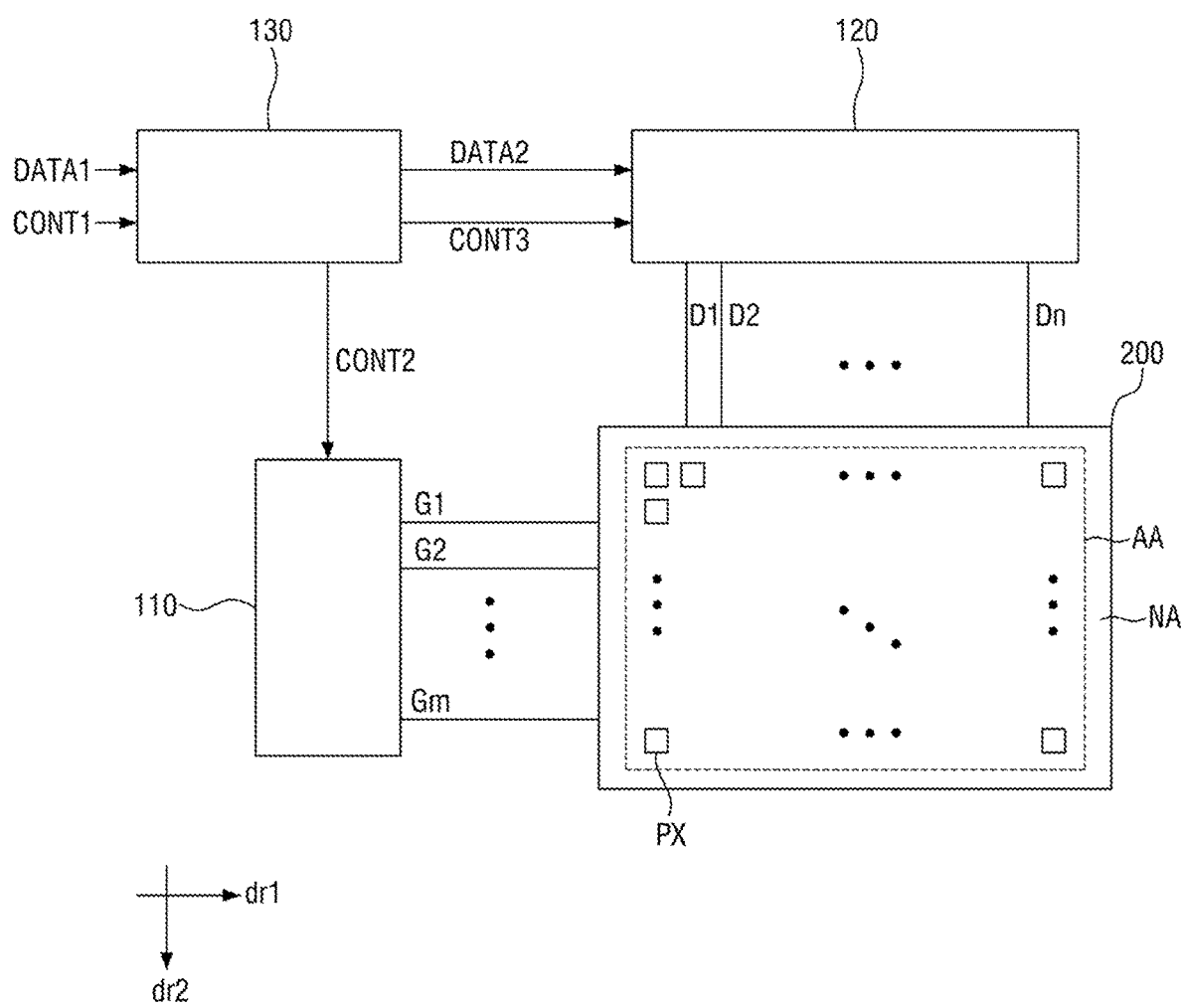
FIG. 2 is a block diagram of a display module according to an exemplary embodiment.

FIG. 2 is a block diagram of a display module according to an exemplary embodiment.

Referring to FIG. 2, the display module PA1 includes a gate driver 110, a data driver 120, a signal controller 130, and a display panel 140.

The display panel 140 may be divided into a display area AA and a non-display area NA. The display area AA may refer to an area where an image is displayed, and the non-display area NA may refer to an area in which an image is not displayed and various components driven to display an image in the display area AA are disposed. The non-display area NA may be arranged to surround the display area AA. In particular, the non-display areas NA of a pair of adjacent display modules may be viewed together as a bezel area, which may appear as a black band.

A plurality of pixel units PXU may be disposed in the display area AA. The pixel units PXU may correspond to minimum units that can display an arbitrary color independently of one another to form an image visible to a user. The pixel units PXU may be arranged in a matrix having m rows and n columns.

Each of the pixel units PXU may include a plurality of pixels PX. The arrangement and the colors of the pixels PX may vary and will be described later.

In the display area AA, a plurality of gate lines G1 through Gm may extend in a first direction dr1, and a plurality of data lines D1 through Dn may extend in a second direction dr2.

The first direction dr1 refers to the column direction of the pixel units PXU (i.e., the direction in which the number of columns increases). The second direction dr2, which is a direction intersecting the first direction dr1, refers to the row direction of the pixel units PXU (i.e., the direction in which the number of rows increases).

The gate lines G1 through Gm may receive gate signals from the gate driver 110, and the data lines D1 through Dn may receive data signals from the data driver 120. Each of the pixels PX may be surrounded by some of the gate lines G1 through Gm and some of the data lines D1 through Dn, but the present disclosure is not limited thereto. That is, alternatively, the pixels PX may all be surrounded at the same time by some of the gate lines G1 through Gm and some of the data lines D1 through Dn.

Each of the pixels PX may uniquely display one of primary colors to implement a color display. Examples of the primary colors include red, green and blue colors. Also, some of the pixels PX may display a white color. Pixels PX displaying a red color will hereinafter be referred to as red pixels, pixels PX displaying a green color will hereinafter be referred to as green pixels, pixels PX displaying a blue color will hereinafter be referred to as blue pixels, and pixels PX displaying a white color will hereinafter be referred to as white pixels. By grouping red, green, blue, and white pixels and controlling the brightness of the red, green, blue, and white pixels, an arbitrary color other than red, green, and blue colors can be displayed. The arrangement of the pixels PX may vary depending on whether the pixels PX are red, green, or blue pixels or white pixels and will be described later.

The signal controller 130 may receive an image signal from the external device MC and controls the gate driver 110 and the data driver 120. The signal controller 130 may receive first video data DATA1 and input control signals CONT1 for controlling the display of the first video data DATA1, from the external device MC and may output gate driver control signals CONT2, control signals CONT3, and second video data DATA2. The first image data DATA1 includes information on the gray levels of the pixels PX and may be divided into frames.

The input control signals CONT1 are transmitted to the signal controller 130, and may include, for example, a vertical synchronization signal, a horizontal synchronization signal, a main clock, and a data enable signal, but the present disclosure is not limited thereto. That is, the input control signals CONT1 may also include various types of signals other than those set forth herein, and each of the vertical synchronization signal, the horizontal synchronization signal, the main clock, and the data enable signal may be omitted. The signal controller 130 may be implemented by an integrated circuit (IC).

The gate driver control signals CONT2 may be signals for controlling the operation of the gate driver 110 and may be generated by the signal controller 130. The gate driver control signals CONT2 may include a scan initiation signal and a clock signal, but the present disclosure is not limited thereto. The gate driver 110 may generate gate signals, which are capable of activating the pixels PX, in accordance with the gate driver control signals CONT2 and may provide the generated gate signals to the gate lines G1 through Gn. The gate driver 110 may be implemented by an IC and may be realized as a circuit using an amorphous silicon gate (ASG) that uses an amorphous silicon (a-Si) thin-film transistor (TFT), an oxide semiconductor, a crystalline semiconductor, or a polycrystalline semiconductor.

The data driver control signals CONT3 may be signals for controlling the operation of the data driver 120 and may be generated by the signal controller 130. The data driver 120 may generate data signals in accordance with the data driver control signals CONT3 and may provide the generated data signals to the data lines D1 through Dn. The data driver 120 may be implemented by an IC.

The gate driver 110, the data driver 120, and the signal controller 130 may be disposed in the non-display area NA.

In exemplary embodiments, the gate driver 110, the data driver 120, and the signal controller 130, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the gate driver 110, the data driver 120, and the signal controller 130, and/or one or more components thereof may include or otherwise be associated with one or more memories (not shown) including code (e.g., instructions) configured to cause the gate driver 110, the data driver 120, and the signal controller 130, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

The arrangement of pixel units PXU, and the arrangement of pixels PX in each of the pixel units PXU, which are disposed in the display area AA, will hereinafter be described.

Figure 3:
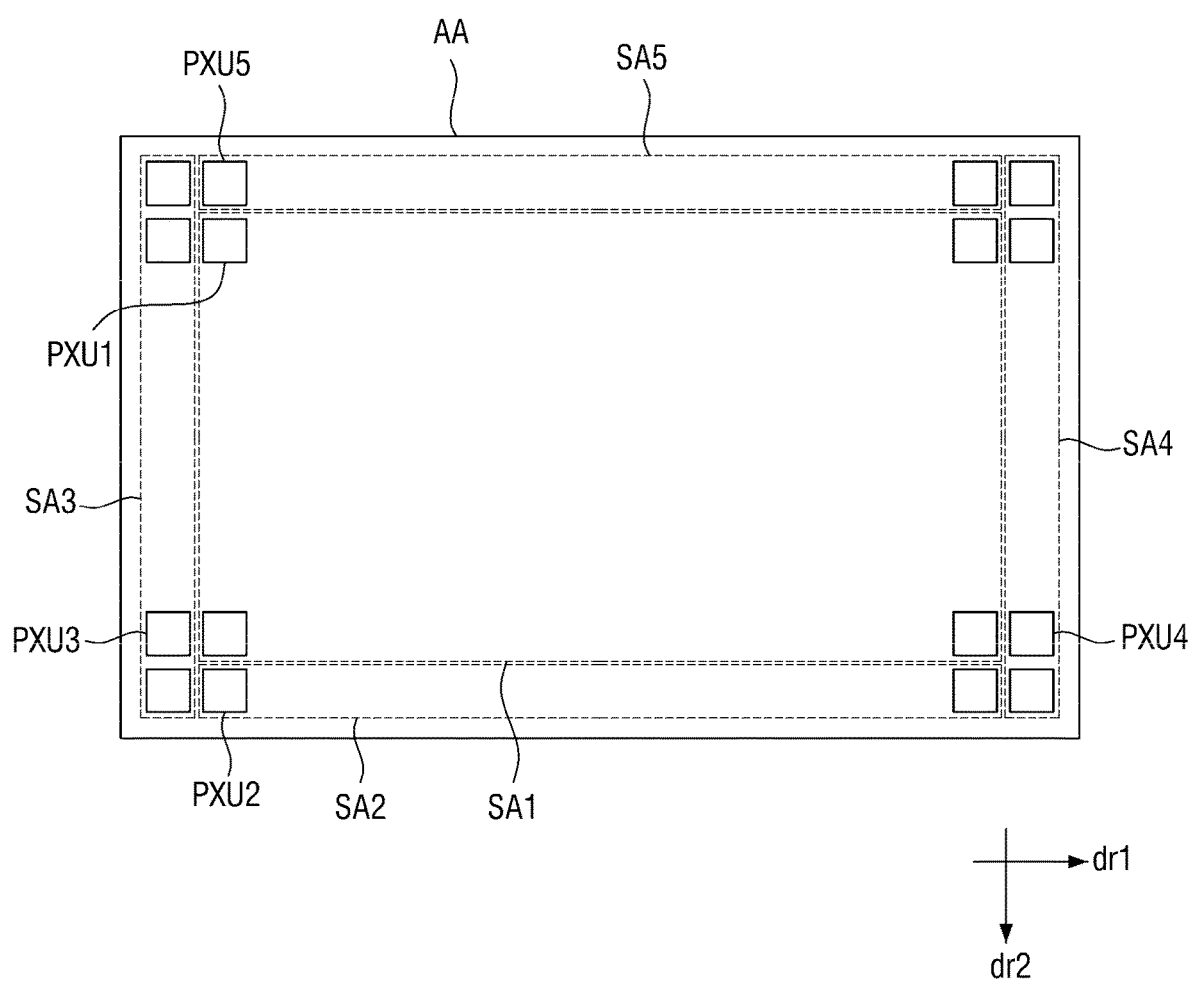
FIG. 3 is a schematic view illustrating the arrangement of pixel units in a display area of a display panel according to an exemplary embodiment.
Figure 4:
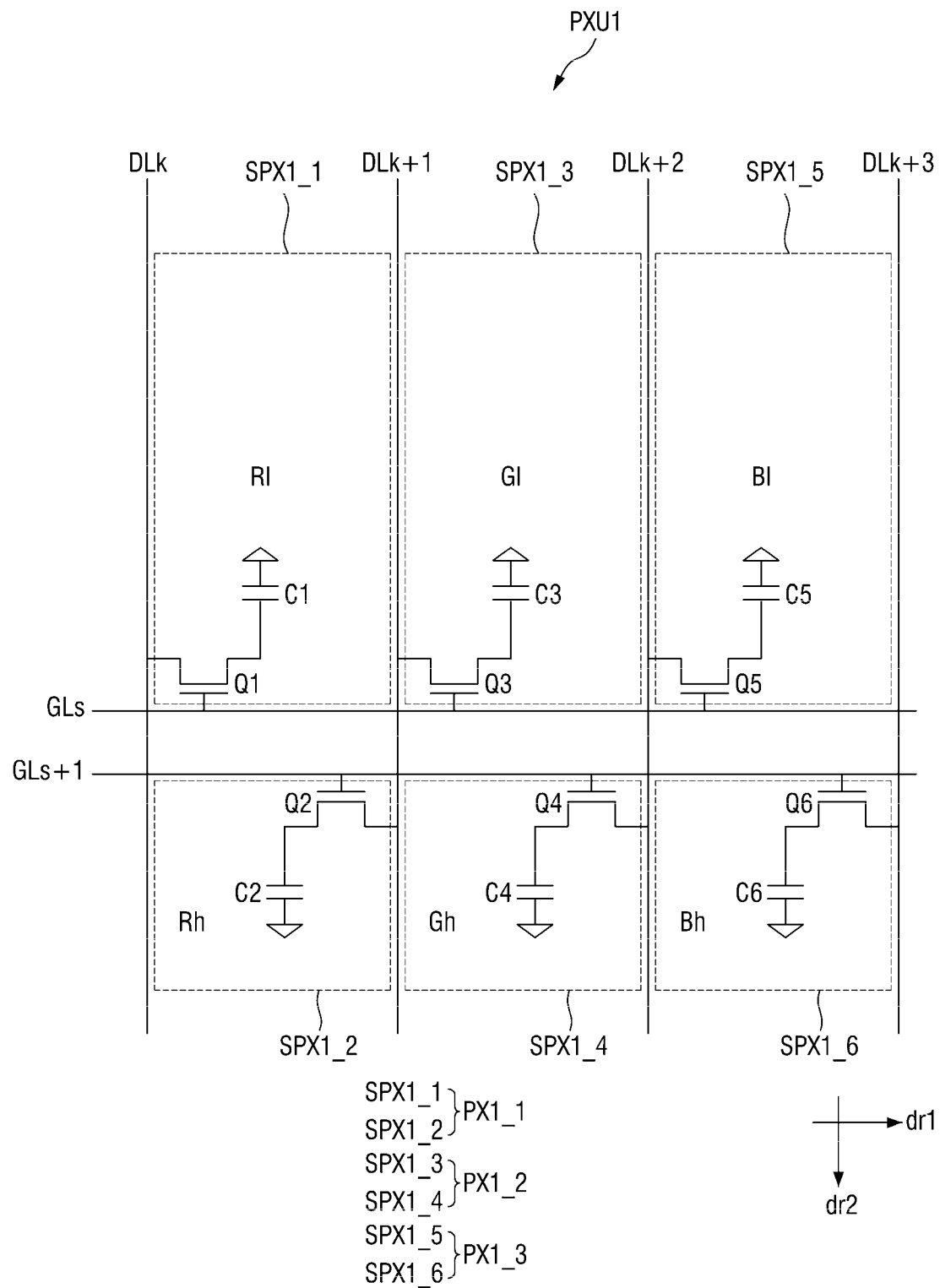
FIG. 4 is a schematic view illustrating the structure of an exemplary embodiment of a first pixel unit.
Figure 5:
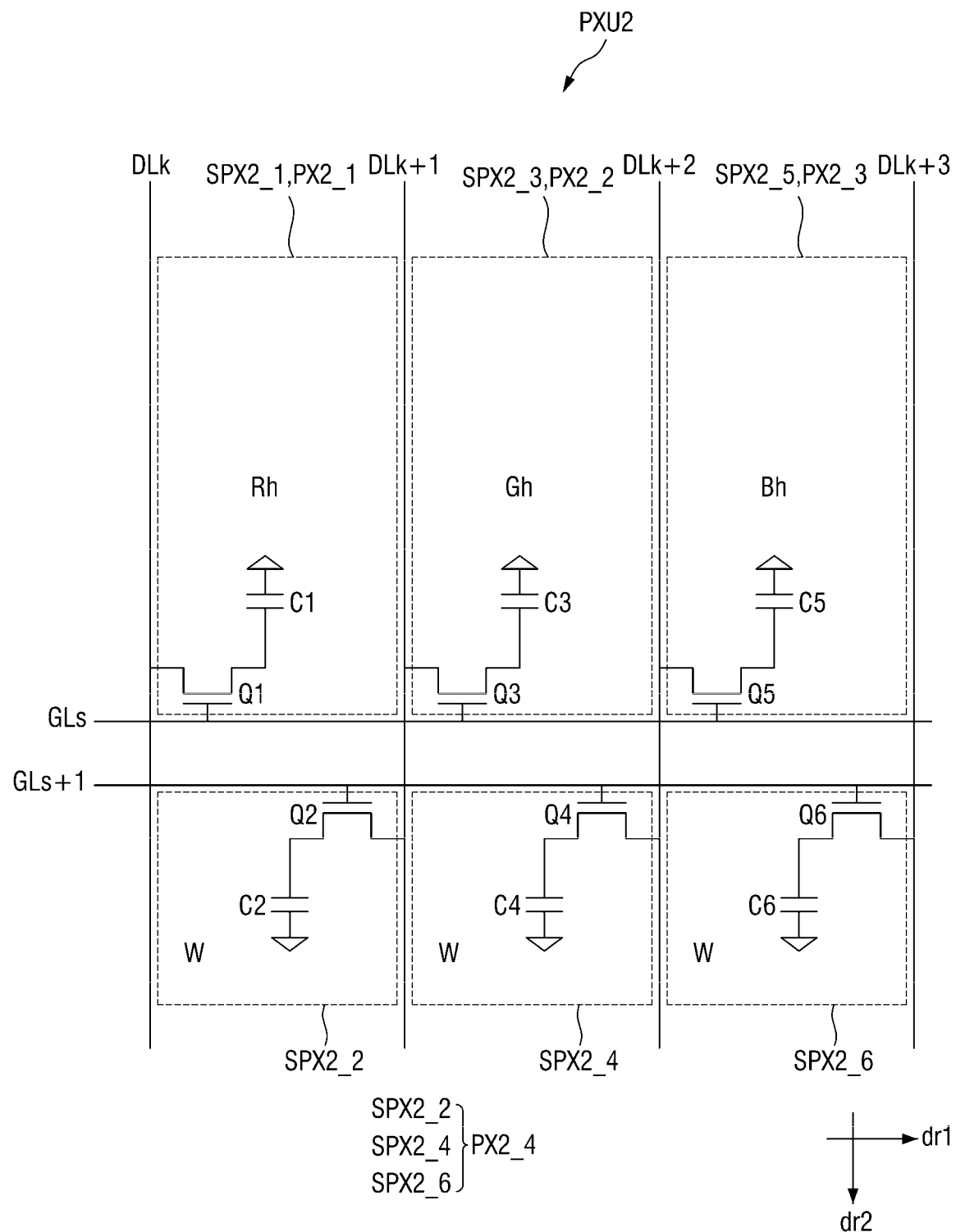
FIG. 5 is a schematic view illustrating the structure of an exemplary embodiment of a second pixel unit.
Figure 6:
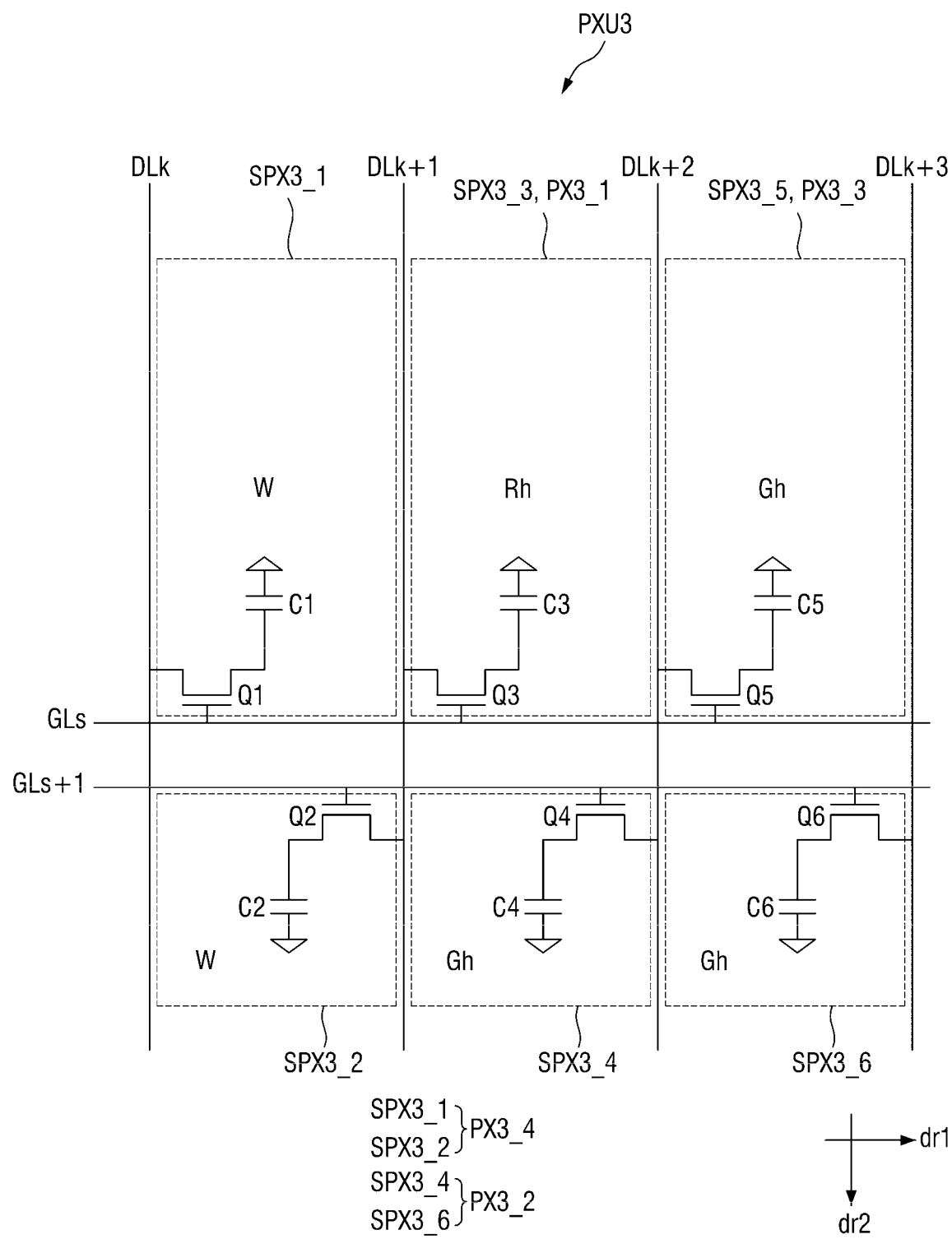
FIG. 6 is a schematic view illustrating the structure of an exemplary embodiment of a third pixel unit.
Figure 7:
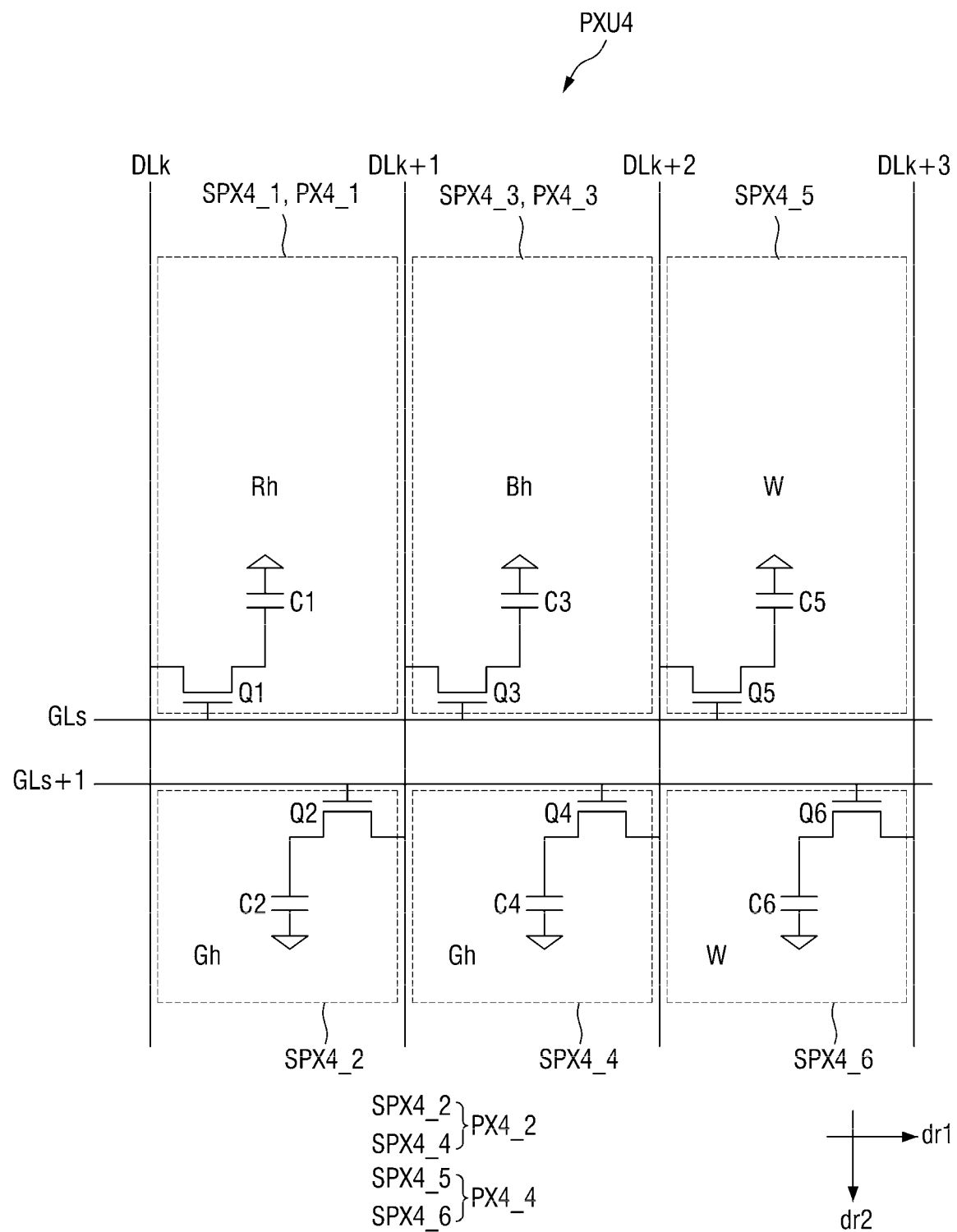
FIG. 7 is a schematic view illustrating the structure of an exemplary embodiment of a fourth pixel unit.
Figure 8:
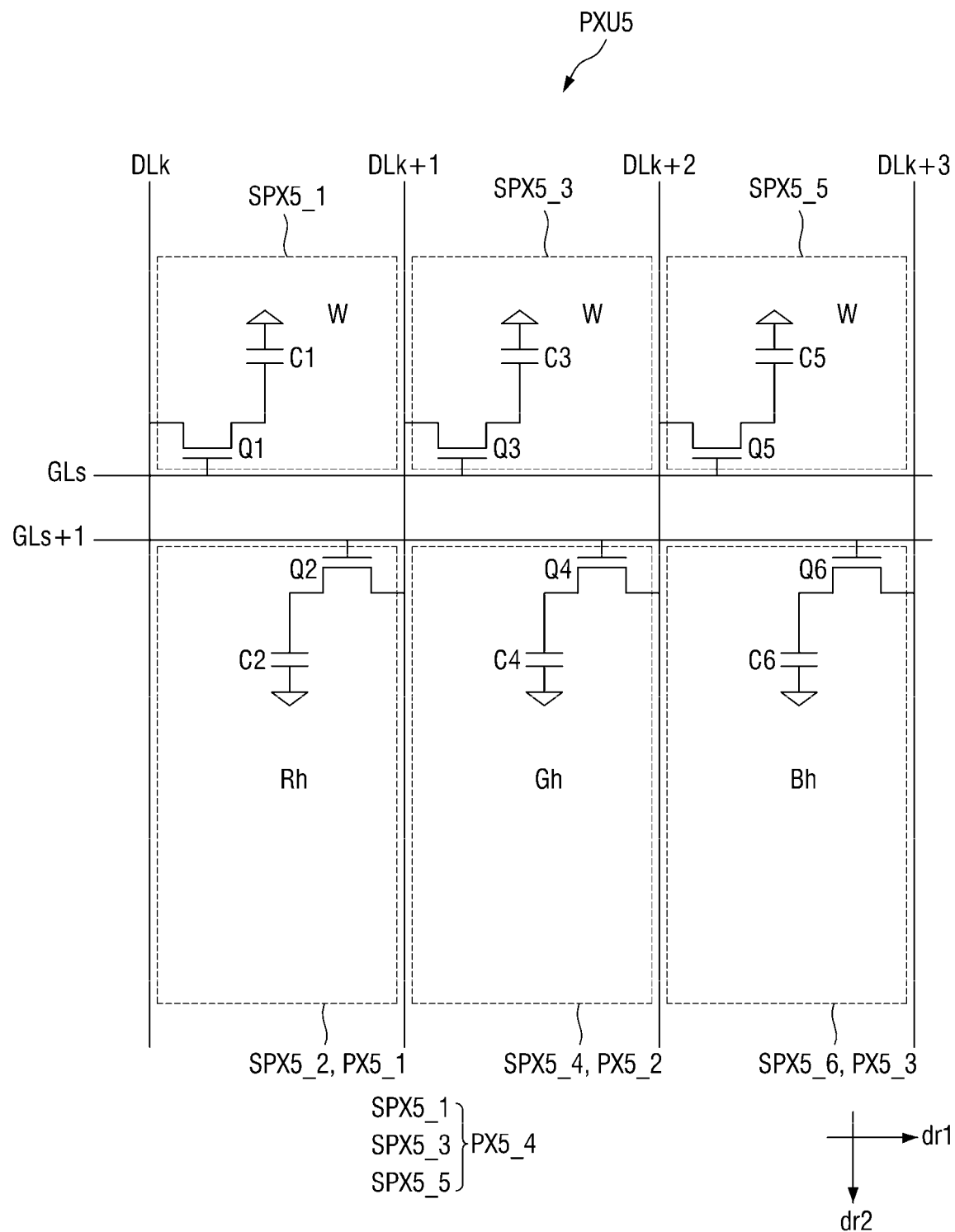
FIG. 8 is a schematic view illustrating the structure of an exemplary embodiment of a fifth pixel unit.

FIG. 3 is a schematic view illustrating the arrangement of pixel units in a display area of a display panel according to an exemplary embodiment, FIG. 4 is a schematic view illustrating the structure of an exemplary first pixel unit, FIG. 5 is a schematic view illustrating the structure of an exemplary second pixel unit, FIG. 6 is a schematic view illustrating the structure of an exemplary third pixel unit, FIG. 7 is a schematic view illustrating the structure of an exemplary fourth pixel unit, and FIG. 8 is a schematic view illustrating the structure of an exemplary fifth pixel unit.

Referring to FIG. 3, the display area AA includes a first sub area SA1, a second sub area SA2, a third sub area SA3, a fourth sub area SA4, and a fifth sub-area SA5. In each of the first, second, third, fourth and fifth sub-areas SA1, SA2, SA3, SA4, and SA5, a plurality of pixel units may be disposed, and the structure of the plurality of pixel units included in each of the first, second, third, fourth and fifth sub-areas SA1, SA2, SA3, SA4, and SA5 may differ from one sub-area to another sub-area.

The first sub-area SA1 may be disposed at the center of the display area AA and may be surrounded by the second, third, fourth and fifth sub-areas SA2, SA3, SA4, and SA5. That is, the second, third, fourth and fifth sub-areas SA2, SA3, SA4, and SA5 may be disposed along the sides of the display area AA.

In the first sub-area SA1, a plurality of first pixel units PXU1 may be arranged in a matrix of a plurality of rows and a plurality of columns. Each of the first pixel units PXU1 may include a plurality of pixels PX, which display red, green, and blue colors. The structure of the first pixel units PXU1 will hereinafter be described with reference to FIG. 4.

Referring to FIG. 4, a first pixel unit PXU1 includes k-th, (k+1)-th, (k+2)-th, and (k+3)-th data lines DLk, DLk+1, DLk+2, and DLk+3 (where k is an integer between 1 and n−3), which transmit data signals, s-th and (s+1)-th gate lines GLs and GLs+1 (where s is an integer between 1 and m−1), which transmit gate signals, and a first sub-pixel SPX1_1, a second sub-pixel SPX1_2, a third sub-pixel SPX1_3, a fourth sub-pixel SPX1_4, a fifth sub-pixel SPX1_5, and a sixth sub-pixel SPX1_6, which are electrically connected to the k-th, (k+1)-th, (k+2)-th, and (k+3)-th data lines DLk, DLk+1, DLk+2, and DLk+3 and the s-th and (s+1)-th gate lines GLs and GLs+1.

In the first pixel unit PXU1, the first, third, and fifth sub-pixels SPX1_1, SPX1_3, and SPX1_5 may be sequentially disposed in a row to be adjacent to one another in a row direction. Also, in the first pixel unit PXU1, the second, fourth, and sixth sub-pixels SPX1_2, SPX1_4, and SPX1_6 may be sequentially disposed in a row next to the row where the first, third, and fifth sub-pixels SPX1_1, SPX1_3, and SPX1_5 to be adjacent to one another in the row direction.

Each of the first through sixth sub-pixels SPX1_1 through SPX1_6 may include a switching transistor and a liquid crystal capacitor.

Specifically, the first sub-pixel SPX1_1 includes a first switching transistor Q1 and a first liquid crystal capacitor C1. The first switching transistor Q1 is a three-terminal device such as a TFT and has a control terminal connected to the s-th gate line GLs, an input terminal connected to the k-th data line DLk, and an output terminal connected to the first liquid crystal capacitor C1.

The second sub-pixel SPX1_2 includes a second switching transistor Q2 and a second liquid crystal capacitor C2. The second switching transistor Q2 is a three-terminal device such as a TFT and has a control terminal connected to the (s+1)-th gate line GLs+1, an input terminal connected to the (k+1)-th data line DLk+1, and an output terminal connected to the second liquid crystal capacitor C2.

The third sub-pixel SPX1_3 includes a third switching transistor Q3 and a third liquid crystal capacitor C3. The third switching transistor Q3 is a three-terminal device such as a TFT and has a control terminal connected to the s-th gate line GLs, an input terminal connected to the (k+1)-th data line DLk+1, and an output terminal connected to the third liquid crystal capacitor C3.

The fourth sub-pixel SPX1_4 includes a fourth switching transistor Q4 and a fourth liquid crystal capacitor C4. The fourth switching transistor Q4 is a three-terminal device such as a TFT and has a control terminal connected to the (s+1)-th gate line GLs+1, an input terminal connected to the (k+2)-th data line DLk+2, and an output terminal connected to the fourth liquid crystal capacitor C4.

The fifth sub-pixel SPX1_5 includes a fifth switching transistor Q5 and a fifth liquid crystal capacitor C5. The fifth switching transistor Q5 is a three-terminal device such as a TFT and has a control terminal connected to the s-th gate line GLs, an input terminal connected to the (k+2)-th data line DLk+2, and an output terminal connected to the fifth liquid crystal capacitor C5.

The sixth sub-pixel SPX1_6 includes a sixth switching transistor Q6 and a sixth liquid crystal capacitor C6. The sixth switching transistor Q6 is a three-terminal device such as a TFT and has a control terminal connected to the (s+1)-th gate line GLs+1, an input terminal connected to the (k+3)-th data line DLk+3, and an output terminal connected to the sixth liquid crystal capacitor C6.

The first, third, and fifth sub-pixels SPX1_1, SPX1_3, and SPX1_5 may be formed to have the substantially the same area. Similarly, the second, fourth, and sixth sub-pixels SPX1_2, SPX1_4, and SPX1_6 may be formed to have the substantially the same area.

The first, third, and fifth sub-pixels SPX1_1, SPX1_3, and SPX1_5 may be formed to have a larger area than the second, fourth, and sixth sub-pixels SPX1_2, SPX1_4, and SPX1_6. Specifically, regions in the first, third, and fifth sub-pixels SPX1_1, SPX1_3, and SPX1_5 that display colors may be twice larger than regions in the second, fourth, and sixth sub-pixels SPX1_2, SPX1_4, and SPX1_6 that display colors.

In a region where the first and second sub-pixels SPX1_1 and SPX1_2 are disposed, a red color filter, which filters or converts light transmitted therethrough for generating the red light may be disposed. Accordingly, the first and second sub-pixels SPX1_1 and SPX1_2 may both display a red color and may thus be collectively defined as a first pixel PX1_1.

A difference in voltage between both terminals of the first liquid crystal capacitor C1, formed by a data signal provided to the first sub-pixel SPX1_1, may be smaller than a difference in voltage between both terminals of the second liquid crystal capacitor C2, formed by a data signal provided to the second sub-pixel SPX1_2. Accordingly, the first and second sub-pixels SPX1_1 and SPX1_2 may both display a red color, but the red color displayed by the first sub-pixel SPX1_1 may be darker than the red color displayed by the second sub-pixel SPX1_2. In other words, the second sub-pixel SPX1_2 may display a brighter red color than the first sub-pixel SPX1_1. In a case where the first and second sub-pixels SPX1_1 and SPX1_2 both display a red color but have different gray levels, visibility can be improved. That is, a deviation between the brightness observed at the front of a display device and the brightness observed on the sides of the display device can be reduced or minimized.

In a region where the third and fourth sub-pixels SPX1_3 and SPX1_4 are disposed, a green color filter, which filters or converts light transmitted therethrough for generating the green light may be disposed. Accordingly, the third and fourth sub-pixels SPX1_3 and SPX1_4 may both display a green color and may thus be collectively defined as a second pixel PX1_2.

A difference in voltage between both terminals of the third liquid crystal capacitor C3, formed by a data signal provided to the third sub-pixel SPX1_3, may be smaller than a difference in voltage between both terminals of the fourth liquid crystal capacitor C4, formed by a data signal provided to the fourth sub-pixel SPX1_4. Accordingly, the third and fourth sub-pixels SPX1_3 and SPX1_4 may both display a green color, but the green color displayed by the third sub-pixel SPX1_3 may be darker than the green color displayed by the fourth sub-pixel SPX1_4. In other words, the fourth sub-pixel SPX1_4 may display a brighter green color than the third sub-pixel SPX1_3. In a case where the third and fourth sub-pixels SPX1_3 and SPX1_4 both display a green color but have different gray levels, visibility can be improved. That is, a deviation between the brightness observed at the front of a display device and the brightness observed on the sides of the display device can be reduced or minimized.

In a region where the fifth and sixth sub-pixels SPX1_5 and SPX1_6 are disposed, a blue color filter, which filters or converts light transmitted therethrough for generating the blue light may be disposed. Accordingly, the fifth and sixth sub-pixels SPX1_5 and SPX1_6 may both display a blue color and may thus be collectively defined as a third pixel PX1_3.

A difference in voltage between both terminals of the fifth liquid crystal capacitor C5, formed by a data signal provided to the fifth sub-pixel SPX1_5, may be smaller than a difference in voltage between both terminals of the sixth liquid crystal capacitor C6, formed by a data signal provided to the sixth sub-pixel SPX1_6. Accordingly, the fifth and sixth sub-pixels SPX1_5 and SPX1_6 may both display a blue color, but the blue color displayed by the fifth sub-pixel SPX1_5 may be darker than the blue color displayed by the sixth sub-pixel SPX1_6. In other words, the sixth sub-pixel SPX1_6 may display a brighter blue color than the fifth sub-pixel SPX1_5. In a case where the fifth and sixth sub-pixels SPX1_5 and SPX1_6 both display a blue color but have different gray levels, visibility can be improved. That is, a deviation between the brightness observed at the front of a display device and the brightness observed on the sides of the display device can be reduced or minimized.

That is, the first pixel unit PXU1 includes the first, second, and third pixels PX1_1, PX1_2, and PX1_3, which display red, green, and blue colors, respectively, and the first, second, and third pixels PX1_1, PX1_2, and PX1_3 include the first and second sub-pixels SPX1_1 and SPX1_2, the third and fourth sub-pixels SPX1_3 and SPX1_4, and the fifth and sixth sub-pixels SPX1_5 and SPX1_6, respectively. Accordingly, visibility can be improved.

In the description that follows, the level of a data signal that produces a relatively large difference in voltage between both terminals of a liquid crystal capacitor may be defined as a high level, and the level of a data signal that produces a relatively small difference in voltage between both terminals of a liquid crystal capacitor may be defined as a low level.

The first, second, and third pixels PX1_1, PX1_2, and PX1_3 may display red, green, and blue colors, respectively, but the order of colors in the first pixel unit PXU1 is not particularly limited thereto.

In the second sub-area SA2, a plurality of second pixel units PXU2 may be arranged in a matrix of at least one row and a plurality of columns. Each of the second pixel units PXU2 may include red, green, and blue pixels and may further include white pixels. The structure of the second pixel units PXU2 will hereinafter be described with reference to FIG. 5.

Referring to FIG. 5, a second pixel unit PXU2 includes the k-th, (k+1)-th, (k+2)-th, and (k+3)-th data lines DLk, DLk+1, DLk+2, and DLk+3, which transmit data signals, the s-th and (s+1)-th gate lines GLs and GLs+1, which transmit gate signals, and a first sub-pixel SPX2_1, a second sub-pixel SPX2_2, a third sub-pixel SPX2_3, a fourth sub-pixel SPX2_4, a fifth sub-pixel SPX2_5, and a sixth sub-pixel SPX2_6, which are electrically connected to the k-th, (k+1)-th, (k+2)-th, and (k+3)-th data lines DLk, DLk+1, DLk+2, and DLk+3 and the s-th and (s+1)-th gate lines GLs and GLs+1.

In the second pixel unit PXU2, the first, third, and fifth sub-pixels SPX2_1, SPX2_3, and SPX2_5 may be sequentially disposed in a row to be adjacent to one another in the row direction. Also, in the second pixel unit PXU2, the second, fourth, and sixth sub-pixels SPX2_2, SPX2_4, and SPX2_6 may be sequentially disposed in a row next to the row where the first, third, and fifth sub-pixels SPX2_1, SPX2_3, and SPX2_5 to be adjacent to one another in the row direction.

Each of the first through sixth sub-pixels SPX2_1 through SPX2_6 may include a switching transistor and a liquid crystal capacitor. The structure of the first through sixth sub-pixels SPX2_1 through SPX2_6 is substantially the same as the structure of the first through sixth sub-pixels SPX1_1 through SPX1_6 of the first pixel unit PXU1 of FIG. 4, and thus, a detailed description thereof will be omitted.

The first, third, and fifth sub-pixels SPX2_1, SPX2_3, and SPX2_5 may be formed to have the substantially the same area. Similarly, the second, fourth, and sixth sub-pixels SPX2_2, SPX2_4, and SPX2_6 may be formed to have the substantially the same area.

The first, third, and fifth sub-pixels SPX2_1, SPX2_3, and SPX2_5 may be formed to have a larger area than the second, fourth, and sixth sub-pixels SPX2_2, SPX2_4, and SPX2_6. Specifically, regions in the first, third, and fifth sub-pixels SPX2_1, SPX2_3, and SPX2_5 that display colors may be twice larger than regions in the second, fourth, and sixth sub-pixels SPX2_2, SPX2_4, and SPX2_6 that display colors.

In a region where the first sub-pixel SPX2_1 is disposed, a red color filter, which filters or converts light transmitted therethrough for generating the red light may be disposed. Accordingly, the first sub-pixel SPX2_1 may display a red color. Since the first sub-pixel SPX2_1 is the only pixel that displays a red color in the second pixel unit PXU2, the first sub-pixel SPX2_1 may be defined as a first pixel PX2_1.

In a region where the third sub-pixel SPX2_3 is disposed, a green color filter, which filters or converts light transmitted therethrough for generating the green light may be disposed. Accordingly, the third sub-pixel SPX2_3 may display a green color. Since the third sub-pixel SPX2_3 is the only pixel that displays a green color in the second pixel unit PXU2, the third sub-pixel SPX2_3 may be defined as a second pixel PX2_2.

In a region where the fifth sub-pixel SPX2_5 is disposed, a blue color filter, which filters or converts light transmitted therethrough for generating the blue light may be disposed. Accordingly, the fifth sub-pixel SPX2_5 may display a blue color. Since the fifth sub-pixel SPX2_5 is the only pixel that displays a blue color in the second pixel unit PXU2, the fifth sub-pixel SPX2_5 may be defined as a third pixel PX2_3.

A data signal having a high level may be provided to the first, third, and fifth sub-pixels SPX2_1, SPX2_3, and SPX2_5.

The first, third, and fifth sub-pixels SPX2_1, SPX2_3, and SPX2_5 of the second pixel unit PXU2 may display red, green, and blue colors, respectively, but the order of colors in the second pixel unit PXU2 may vary.

In a region where the second, fourth, and sixth sub-pixels SPX2_2, SPX2_4, and SPX2_6 are disposed, a white color filter, which filters or converts light transmitted therethrough for generating the white light may be disposed. Alternatively, a white color may be realized by not providing an additional filter layer or conversion layer in the region where the second, fourth, and sixth sub-pixels SPX2_2, SPX2_4, and SPX2_6 are disposed, but it may still be assumed that a white color filter is disposed in the region where the second, fourth, and sixth sub-pixels SPX2_2, SPX2_4, and SPX2_6 are disposed. The second, fourth, and sixth sub-pixels SPX2_2, SPX2_4, and SPX2_6 may all display a white color and may thus be collectively defined as a fourth PX2_4.

The level of a data signal provided to the second sub-pixel SPX2_2 may be the same as the level of the data signal provided to the first sub-pixel SPX2_1, which is disposed adjacent to the second sub-pixel SPX2_2. That is, the data signal provided to the second sub-pixel SPX2_2 may have the same high level as the data signal provided to the first sub-pixel SPX2_1.

Similarly, the level of a data signal provided to the fourth sub-pixel SPX2_4 may be the same as the level of the data signal provided to the third sub-pixel SPX2_3, which is disposed adjacent to the fourth sub-pixel SPX2_4. That is, the data signal provided to the fourth sub-pixel SPX2_4 may have the same high level as the data signal provided to the third sub-pixel SPX2_3.

Similarly, the level of a data signal provided to the sixth sub-pixel SPX2_6 may be the same as the level of the data signal provided to the fifth sub-pixel SPX2_5, which is disposed adjacent to the sixth sub-pixel SPX2_6. That is, the data signal provided to the sixth sub-pixel SPX2_6 may have the same high level as the data signal provided to the fifth sub-pixel SPX2_5. In conclusion, the first through sixth sub-pixels SPX2_1 through SPX2_6 of the second pixel unit PXU2 may all be provided with data signals having a high level.

In a case where the second pixel units PXU2 in the second sub-area SA2 are formed to have the structure illustrated in FIG. 5, the width of the bezel area between the display modules PA1, PA2, PA3, and PA4 may appear small to the user. Specifically, the second sub-area SA2 may adjoin the first sub-area SA1 on an upper side thereof and may adjoin the non-display area NA on a lower side thereof. The sub-pixels of each of the second pixel units SPU2 that adjoin the non-display area NA may be the second, fourth, and sixth sub-pixels SPX2_2, SPX2_4, and SPX2_6. Since the second, fourth, and sixth sub-pixels SPX2_2, SPX2_4, and SPX2_6 all display a white color, the user may recognize the second, fourth, and sixth sub-pixels SPX2_2, SPX2_4, and SPX2_6, rather than the non-display area NA, and as a result, the width of the non-display area NA that is recognizable to the user can be reduced or minimized.

In the third sub-area SA3, a plurality of third pixel units PXU3 may be arranged in a matrix of a plurality of rows and at least one column. Each of the third pixel units PXU3 may include red, green, and blue pixels and may further include white pixels. The structure of the third pixel units PXU3 will hereinafter be described with reference to FIG. 6.

Referring to FIG. 6, a third pixel unit PXU3 includes the k-th, (k+1)-th, (k+2)-th, and (k+3)-th data lines DLk, DLk+1, DLk+2, and DLk+3, which transmit data signals, the s-th and (s+1)-th gate lines GLs and GLs+1, which transmit gate signals, and a first sub-pixel SPX3_1, a second sub-pixel SPX3_2, a third sub-pixel SPX3_3, a fourth sub-pixel SPX3_4, a fifth sub-pixel SPX3_5, and a sixth sub-pixel SPX3_6, which are electrically connected to the k-th, (k+1)-th, (k+2)-th, and (k+3)-th data lines DLk, DLk+1, DLk+2, and DLk+3 and the s-th and (s+1)-th gate lines GLs and GLs+1.

In the third pixel unit PXU3, the first, third, and fifth sub-pixels SPX3_1, SPX3_3, and SPX3_5 may be sequentially disposed in a row to be adjacent to one another in the row direction. Also, in the third pixel unit PXU3, the second, fourth, and sixth sub-pixels SPX3_2, SPX3_4, and SPX3_6 may be sequentially disposed in a row next to the row where the first, third, and fifth sub-pixels SPX3_1, SPX3_3, and SPX3_5 to be adjacent to one another in the row direction.

Each of the first through sixth sub-pixels SPX3_1 through SPX3_6 may include a switching transistor and a liquid crystal capacitor. The structure of the first through sixth sub-pixels SPX3_1 through SPX3_6 is substantially the same as the structure of the first through sixth sub-pixels SPX1_1 through SPX1_6 of the first pixel unit PXU1 of FIG. 4, and thus, a detailed description thereof will be omitted.

The first, third, and fifth sub-pixels SPX3_1, SPX3_3, and SPX3_5 may be formed to have the substantially the same area. Similarly, the second, fourth, and sixth sub-pixels SPX3_2, SPX3_4, and SPX3_6 may be formed to have the substantially the same area.

The first, third, and fifth sub-pixels SPX3_1, SPX3_3, and SPX3_5 may be formed to have a larger area than the second, fourth, and sixth sub-pixels SPX3_2, SPX3_4, and SPX3_6. Specifically, regions in the first, third, and fifth sub-pixels SPX3_1, SPX3_3, and SPX3_5 that display colors may be twice larger than regions in the second, fourth, and sixth sub-pixels SPX3_2, SPX3_4, and SPX3_6 that display colors.

In a region where the first and second sub-pixels SPX3_1 and SPX3_2 are disposed, a white color filter, which filters or converts light transmitted therethrough for generating the white light may be disposed. Accordingly, the first and second sub-pixels SPX3_1 and SPX3_2 may display a white color. Since the first and second sub-pixels SPX3_1 and SPX3_2 both display a white color, the first and second sub-pixels SPX3_1 and SPX3_2 may be collectively defined as a fourth pixel PX3_4.

In a region where the third sub-pixel SPX3_3 is disposed, a red color filter, which filters or converts light transmitted therethrough for generating the red light may be disposed. Accordingly, the third sub-pixel SPX3_3 may display a red color. Since the third sub-pixel SPX3_3 is the only pixel that displays a red color in the third pixel unit PXU3, the third sub-pixel SPX3_3 may be defined as a first pixel PX3_1.

In a region where the fifth sub-pixel SPX3_5 is disposed, a blue color filter, which filters or converts light transmitted therethrough for generating the blue light may be disposed. Accordingly, the fifth sub-pixel SPX3_5 may display a blue color. Since the fifth sub-pixel SPX3_5 is the only pixel that displays a blue color in the third pixel unit PXU3, the fifth sub-pixel SPX3_5 may be defined as a third pixel PX3_3.

In a region where the fourth and sixth sub-pixels SPX3_4 and SPX3_6 are disposed, a green color filter, which filters or converts light transmitted therethrough for generating the green light may be disposed. Accordingly, the fourth and sixth sub-pixels SPX3_4 and SPX3_6 may display a green color. Since the fourth and sixth sub-pixels SPX3_4 and SPX3_6 both display a green color, the fourth and sixth sub-pixels SPX3_4 and SPX3_6 may be collectively defined as a second pixel PX3_2.

Data signals provided to the first through sixth sub-pixels SPX3_1 through SPX3_6 may all have a high level. Particularly, the data signal provided to the first sub-pixel SPX3_1, which displays a white color, may have the same level as the data signal provided to the third sub-pixel SPX3_3, which is disposed adjacent to the first sub-pixel SPX3_1. Similarly, the data signal provided to the second sub-pixel SPX3_2, which displays a white color, may have the same level as the data signal provided to the fourth sub-pixel SPX3_4, which is disposed adjacent to the second sub-pixel SPX3_2.

As described above, the area of regions in the fourth and sixth sub-pixels SPX3_4 and SPX3_6 that display colors may be half the area of a region in the third sub-pixel SPX3_3 that displays a color or half the area of a region in the fifth sub-pixel SPX3_5 that displays a color. Thus, regions in the third pixel unit PXU3 that display red, green, and blue colors may have the same area.

The arrangement of the regions in the third pixel unit PXU3 that display red, green, and blue colors may vary. However, since the first and second sub-pixels SPX3_1 and SPX3_2 are disposed adjacent to the non-display area NA, the first and second sub-pixels SPX3_1 and SPX3_2 may be forced to display a white color.

In a case where the third pixel units PXU3 in the third sub-area SA3 are formed to have the structure illustrated in FIG. 6, the width of the bezel area between the display modules PA1, PA2, PA3, and PA4 may appear small to the user. Specifically, the third sub-area SA3 may adjoin the first sub-area SA1 on the right side thereof and may adjoin the non-display area NA on the left side thereof. The sub-pixels of each of the third pixel units SPU3 that adjoin the non-display area NA may be the first and second sub-pixels SPX3_1 and SPX3_2. Since the first and second sub-pixels SPX3_1 and SPX3_2 both display a white color, the user may recognize the first and second sub-pixels SPX3_1 and SPX3_2, rather than the non-display area NA, and as a result, the width of the non-display area NA that is recognizable to the user can be reduced or minimized.

In the fourth sub-area SA4, a plurality of fourth pixel units PXU4 may be arranged in a matrix of a plurality of rows and at least one column. Each of the fourth pixel units PXU4 may include red, green, and blue pixels and may further include white pixels. The structure of the fourth pixel units PXU4 will hereinafter be described with reference to FIG. 7.

Referring to FIG. 7, a fourth pixel unit PXU4 includes the k-th, (k+1)-th, (k+2)-th, and (k+3)-th data lines DLk, DLk+1, DLk+2, and DLk+3, which transmit data signals, the s-th and (s+1)-th gate lines GLs and GLs+1, which transmit gate signals, and a first sub-pixel SPX4_1, a second sub-pixel SPX4_2, a third sub-pixel SPX4_3, a fourth sub-pixel SPX4_4, a fifth sub-pixel SPX4_5, and a sixth sub-pixel SPX4_6, which are electrically connected to the k-th, (k+1)-th, (k+2)-th, and (k+3)-th data lines DLk, DLk+1, DLk+2, and DLk+3 and the s-th and (s+1)-th gate lines GLs and GLs+1.

In the fourth pixel unit PXU4, the first, third, and fifth sub-pixels SPX4_1, SPX4_3, and SPX4_5 may be sequentially disposed in a row to be adjacent to one another in the row direction. Also, in the fourth pixel unit PXU4, the second, fourth, and sixth sub-pixels SPX4_2, SPX4_4, and SPX4_6 may be sequentially disposed in a row next to the row where the first, third, and fifth sub-pixels SPX4_1, SPX4_3, and SPX4_5 to be adjacent to one another in the row direction.

Each of the first through sixth sub-pixels SPX4_1 through SPX4_6 may include a switching transistor and a liquid crystal capacitor. The structure of the first through sixth sub-pixels SPX4_1 through SPX4_6 is substantially the same as the structure of the first through sixth sub-pixels SPX1_1 through SPX1_6 of the first pixel unit PXU1 of FIG. 4, and thus, a detailed description thereof will be omitted.

The first, third, and fifth sub-pixels SPX4_1, SPX4_3, and SPX4_5 may be formed to have the substantially the same area. Similarly, the second, fourth, and sixth sub-pixels SPX4_2, SPX4_4, and SPX4_6 may be formed to have the substantially the same area.

The first, third, and fifth sub-pixels SPX4_1, SPX4_3, and SPX4_5 may be formed to have a larger area than the second, fourth, and sixth sub-pixels SPX4_2, SPX4_4, and SPX4_6. Specifically, regions in the first, third, and fifth sub-pixels SPX4_1, SPX4_3, and SPX4_5 that display colors may be twice larger than regions in the second, fourth, and sixth sub-pixels SPX4_2, SPX4_4, and SPX4_6 that display colors.

In a region where the first sub-pixel SPX4_1 is disposed, a red color filter, which filters or converts light transmitted therethrough for generating the red light may be disposed. Accordingly, the first sub-pixel SPX4_1 may display a red color. Since the first sub-pixel SPX4_1 is the only pixel that displays a red color in the fourth pixel unit PXU4, the first sub-pixel SPX4_1 may be defined as a first pixel PX4_1.

In a region where the third sub-pixel SPX4_3 is disposed, a blue color filter, which filters or converts light transmitted therethrough for generating the blue light may be disposed. Accordingly, the third sub-pixel SPX4_3 may display a blue color. Since the third sub-pixel SPX4_3 is the only pixel that displays a blue color in the fourth pixel unit PXU4, the third sub-pixel SPX4_3 may be defined as a third pixel PX4_3.

In a region where the second and fourth sub-pixels SPX4_2 and SPX4_4 are disposed, a green color filter, which filters or converts light transmitted therethrough for generating the green light may be disposed. Accordingly, the second and fourth sub-pixels SPX4_2 and SPX4_4 may display a green color. Since the second and fourth sub-pixels SPX4_2 and SPX4_4 both display a green color, the second and fourth sub-pixels SPX4_2 and SPX4_4 may be collectively defined as a second pixel PX4_2.

In a region where the fifth and sixth sub-pixels SPX4_5 and SPX4_6 are disposed, a white color filter, which filters or converts light transmitted therethrough for generating the white light may be disposed. Accordingly, the fifth and sixth sub-pixels SPX4_5 and SPX4_6 may display a white color. Since the fifth and sixth sub-pixels SPX4_5 and SPX4_6 both display a white color, the fifth and sixth sub-pixels SPX4_5 and SPX4_6 may be collectively defined as a fourth pixel PX4_4.

Data signals provided to the first through sixth sub-pixels SPX4_1 through SPX4_6 may all have a high level. Particularly, the data signal provided to the fifth sub-pixel SPX4_5, which displays a white color, may have the same level as the data signal provided to the third sub-pixel SPX4_3, which is disposed adjacent to the fifth sub-pixel SPX4_5. Similarly, the data signal provided to the sixth sub-pixel SPX4_6, which displays a white color, may have the same level as the data signal provided to the fourth sub-pixel SPX4_4, which is disposed adjacent to the sixth sub-pixel SPX4_6.

As described above, the area of regions in the second and fourth sub-pixels SPX4_2 and SPX4_4 that display colors may be half the area of a region in the first sub-pixel SPX4_1 that displays a color or half the area of a region in the third sub-pixel SPX4_3 that displays a color. Thus, regions in the fourth pixel unit PXU4 that display red, green, and blue colors may have the same area.

The arrangement of the regions in the fourth pixel unit PXU4 that display red, green, and blue colors may vary. However, since the fifth and sixth sub-pixels SPX4_5 and SPX4_6 are disposed adjacent to the non-display area NA, the fifth and sixth sub-pixels SPX4_5 and SPX4_6 may be forced to display a white color.

In a case where the fourth pixel units PXU4 in the fourth sub-area SA4 are formed to have the structure illustrated in FIG. 7, the width of the bezel area between the display modules PA1, PA2, PA3, and PA4 may appear small to the user. Specifically, the fourth sub-area SA4 may adjoin the first sub-area SA1 on the left side thereof and may adjoin the non-display area NA on the right side thereof. The sub-pixels of each of the fourth pixel units SPU4 that adjoin the non-display area NA may be the fifth and sixth sub-pixels SPX4_5 and SPX4_6. Since the fifth and sixth sub-pixels SPX4_5 and SPX4_6 both display a white color, the user may recognize the fifth and sixth sub-pixels SPX4_5 and SPX4_6, rather than the non-display area NA, and as a result, the width of the non-display area NA that is recognizable to the user can be reduced or minimized.

In the fifth sub-area SA5, a plurality of fifth pixel units PXU5 may be arranged in a matrix of at least one row and a plurality of columns. Each of the fifth pixel units PXU5 may include red, green, and blue pixels and may further include white pixels. The structure of the fifth pixel units PXU5 will hereinafter be described with reference to FIG. 8.

Referring to FIG. 8, a fifth pixel unit PXU5 includes the k-th, (k+1)-th, (k+2)-th, and (k+3)-th data lines DLk, DLk+1, DLk+2, and DLk+3, which transmit data signals, the s-th and (s+1)-th gate lines GLs and GLs+1, which transmit gate signals, and a first sub-pixel SPX5_1, a second sub-pixel SPX5_2, a third sub-pixel SPX5_3, a fourth sub-pixel SPX5_4, a fifth sub-pixel SPX5_5, and a sixth sub-pixel SPX5_6, which are electrically connected to the k-th, (k+1)-th, (k+2)-th, and (k+3)-th data lines DLk, DLk+1, DLk+2, and DLk+3 and the s-th and (s+1)-th gate lines GLs and GLs+1.

In the fifth pixel unit PXU5, the first, third, and fifth sub-pixels SPX5_1, SPX5_3, and SPX5_5 may be sequentially disposed in a row to be adjacent to one another in the row direction. Also, in the fifth pixel unit PXU5, the second, fourth, and sixth sub-pixels SPX5_2, SPX5_4, and SPX5_6 may be sequentially disposed in a row next to the row where the first, third, and fifth sub-pixels SPX5_1, SPX5_3, and SPX5_5 to be adjacent to one another in the row direction.

Each of the first through sixth sub-pixels SPX5_1 through SPX5_6 may include a switching transistor and a liquid crystal capacitor. The structure of the first through sixth sub-pixels SPX5_1 through SPX5_6 is substantially the same as the structure of the first through sixth sub-pixels SPX1_1 through SPX1_6 of the first pixel unit PXU1 of FIG. 4, and thus, a detailed description thereof will be omitted.

The first, third, and fifth sub-pixels SPX5_1, SPX5_3, and SPX5_5 may be formed to have the same area. Similarly, the second, fourth, and sixth sub-pixels SPX5_2, SPX5_4, and SPX5_6 may be formed to have the same area.

In the fifth pixel unit PXU5, unlike in the first, second, third, and fourth pixel units PXU1, PXU2, PXU3, and PXU4 of FIGS. 4, 5, 6, and 7, the first, third, and fifth sub-pixels SPX5_1, SPX5_3, and SPX5_5 may be formed to have a smaller area than the second, fourth, and sixth sub-pixels SPX5_2, SPX5_4, and SPX5_6. Specifically, the area of regions in the first, third, and fifth sub-pixels SPX5_1, SPX5_3, and SPX5_5 that display colors may be half the area of regions in the second, fourth, and sixth sub-pixels SPX5_2, SPX5_4, and SPX5_6 that display colors.

In a region where the second sub-pixel SPX5_2 is disposed, a red color filter, which filters or converts light transmitted therethrough for generating the red light may be disposed. Accordingly, the second sub-pixel SPX5_2 may display a red color. Since the second sub-pixel SPX5_2 is the only pixel that displays a red color in the fifth pixel unit PXU5, the second sub-pixel SPX5_2 may be defined as a first pixel PX5_1.

In a region where the fourth sub-pixel SPX5_4 is disposed, a green color filter, which filters or converts light transmitted therethrough for generating the green light may be disposed. Accordingly, the fourth sub-pixel SPX5_4 may display a green color. Since the fourth sub-pixel SPX5_4 is the only pixel that displays a green color in the fifth pixel unit PXU5, the fourth sub-pixel SPX5_4 may be defined as a second pixel PX5_2.

In a region where the sixth sub-pixel SPX5_6 is disposed, a blue color filter, which filters or converts light transmitted therethrough for generating the blue light may be disposed. Accordingly, the sixth sub-pixel SPX5_6 may display a blue color. Since the sixth sub-pixel SPX5_6 is the only pixel that displays a blue color in the fifth pixel unit PXU5, the sixth sub-pixel SPX5_6 may be defined as a third pixel PX5_3.

The second, fourth, and sixth sub-pixels SPX5_2, SPX5_4, and SPX5_6 of the fifth pixel unit PXU5 may display red, green, and blue colors, respectively, but the order of colors in the fifth pixel unit PXU5 may vary.

In a region where the first, third, and fifth sub-pixels SPX5_1, SPX5_3, and SPX5_5 are disposed, a white color filter, which filters or converts light transmitted therethrough for generating the white light may be disposed. Accordingly, the first, third, and fifth sub-pixels SPX5_1, SPX5_3, and SPX5_5 may all display a white color and may thus be collectively defined as a fourth pixel PX5_4.

The level of a data signal provided to the first sub-pixel SPX5_1 may be the same as the level of a data signal provided to the second sub-pixel SPX5_2, which is disposed adjacent to the first sub-pixel SPX5_1. That is, the data signal provided to the first sub-pixel SPX5_1 may have the same high level as the data signal provided to the second sub-pixel SPX5_2.

Similarly, the level of a data signal provided to the third sub-pixel SPX5_3 may be the same as the level of the data signal provided to the fourth sub-pixel SPX5_4, which is disposed adjacent to the third sub-pixel SPX5_3. That is, the data signal provided to the third sub-pixel SPX5_3 may have the same high level as the data signal provided to the fourth sub-pixel SPX5_4.

Similarly, the level of a data signal provided to the fifth sub-pixel SPX5_5 may be the same as the level of the data signal provided to the sixth sub-pixel SPX5_6, which is disposed adjacent to the fifth sub-pixel SPX5_5. That is, the data signal provided to the fifth sub-pixel SPX5_5 may have the same high level as the data signal provided to the sixth sub-pixel SPX6_6. In conclusion, the first through sixth sub-pixels SPX5_1 through SPX5_6 of the fifth pixel unit PXU5 may all be provided with data signals having a high level.

In a case where the fifth pixel units PXU5 in the fifth sub-area SA5 are formed to have the structure illustrated in FIG. 8, the width of the bezel area between the display modules PA1, PA2, PA3, and PA4 may appear small to the user. Specifically, the fifth sub-area SA5 may adjoin the first sub-area SA1 on a lower side thereof and may adjoin the non-display area NA on an upper side thereof. The sub-pixels of each of the fifth pixel units SPU5 that adjoin the non-display area NA may be the first, third, and fifth sub-pixels SPX5_1, SPX5_3, and SPX5_5. Since the first, third, and fifth sub-pixels SPX5_1, SPX5_3, and SPX5_5 all display a white color, the user may recognize the first, third, and fifth sub-pixels SPX5_1, SPX5_3, and SPX5_5, rather than the non-display area NA, and as a result, the width of the non-display area NA that is recognizable to the user can be reduced or minimized.

Figure 9:
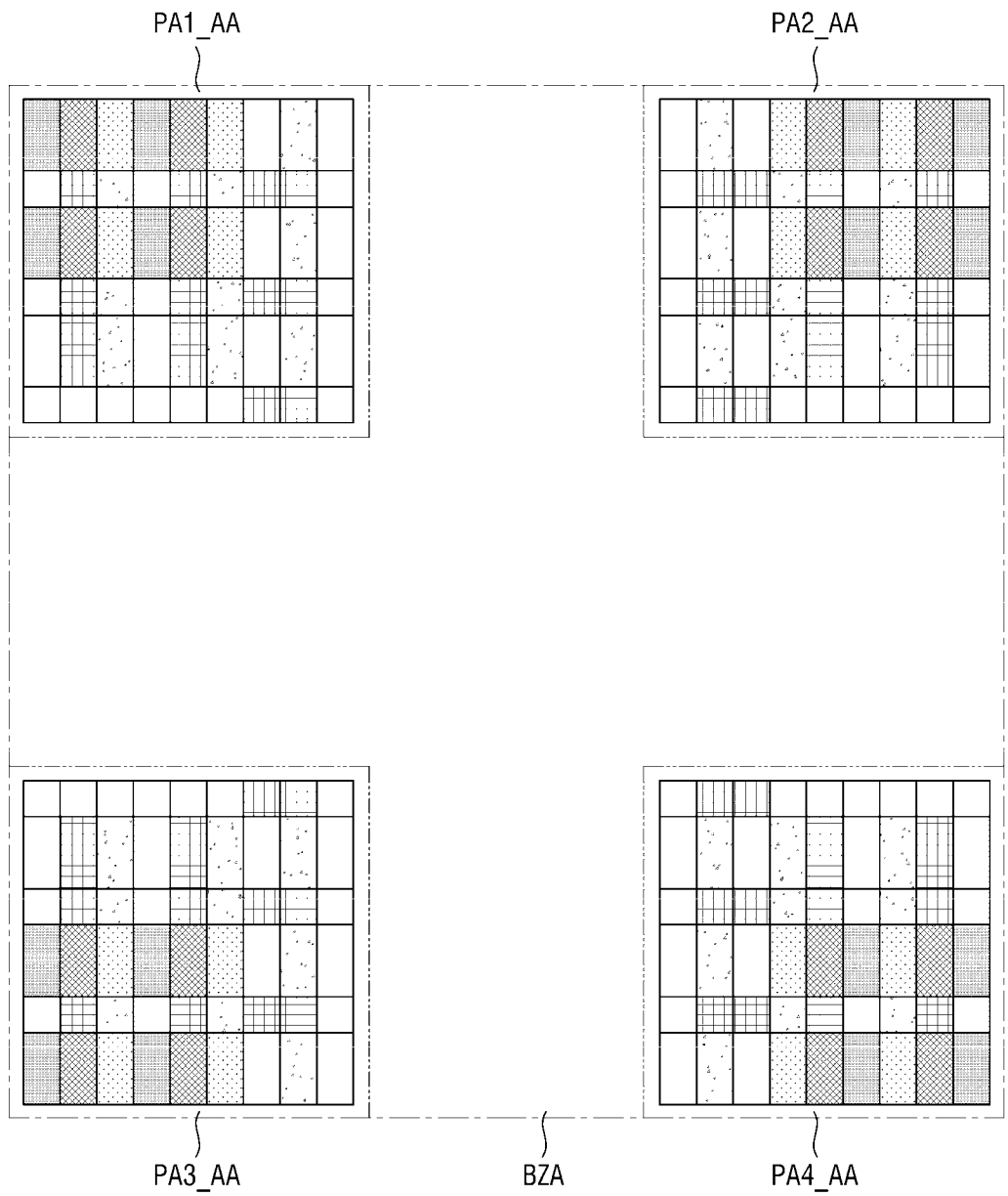
FIG. 9 is an enlarged layout view of an area A of FIG. 1.

FIG. 9 is an enlarged layout view of an area A of FIG. 1.

Referring to FIG. 9, the area A is an area where a plurality of display modules (PA1, PA2, PA3, and PA4) adjoin one another. Specifically, the area A is an area where four display modules, i.e., the display modules PA1, PA2, PA3, and PA4, adjoin one another. The display modules PA1, PA2, PA3, and PA4 have display areas PA1_AA, PA2_AA, PA3_AA, and PA4_AA, respectively, and in each of the display areas PA1_AA, PA2_AA, PA3_AA, and PA4_AA, the first pixel units PXU1, the second pixel units PXU2, the third pixel units PXU3, the fourth pixel units PXU4, and the fifth pixel units PXU5 that have been described above are disposed.

A bezel area BZA is disposed between the display areas PA1_AA, PA2_AA, PA3_AA, and PA4_AA of the display modules PA1, PA2, PA3, and PA4. Although not specifically illustrated, the bezel area BZA may consist of the non-display areas of the display modules PA1, PA2, PA3, and PA4 and may be viewed as black bands.

However, if the first pixel units PXU1, the second pixel units PXU2, the third pixel units PXU3, the fourth pixel units PXU4, and the fifth pixel units PXU5 are disposed in the first, second, third, fourth, and fifth sub-areas SA1, SA2, SA3, SA4, and SA5, respectively, white pixels can be disposed adjacent to the bezel area BZA. As a result, the width of the bezel area BZA that is recognizable to the user can be reduced or minimized.

Figure 10:
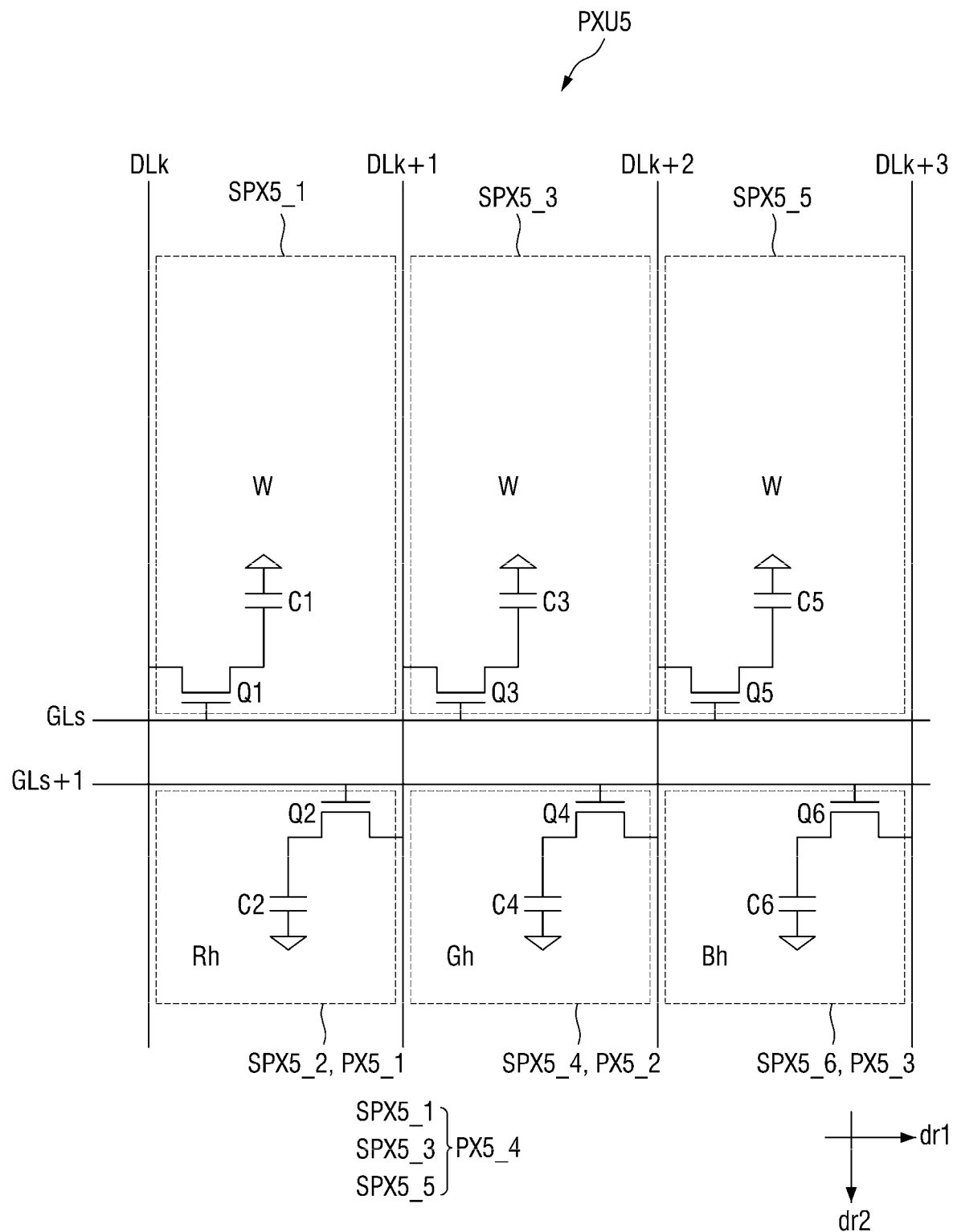
FIG. 10 is a schematic view illustrating the structure of another exemplary embodiment of a fifth pixel unit.

FIG. 10 is a schematic view illustrating the structure of another exemplary fifth pixel unit.

In FIGS. 3, 4, 5, 6, 7, 8 and 10, like reference numerals indicate like elements, and thus, detailed descriptions thereof will be omitted.

Referring to FIG. 10, a fifth pixel unit PXU5 includes a first sub-pixel PX5_1, a second sub-pixel PX5_2, a third sub-pixel PX5_3, a fourth sub-pixel PX5_4, a fifth sub-pixel PX5_5, and a sixth sub-pixel SPX5_6. The arrangement of the color filters of the first through sixth sub-pixels SPX5_1 through SPX5_6 of the fifth pixel unit PXU5 of FIG. 10 may be the same as the arrangement of the color filters of the first through sixth sub-pixels SPX5_1 through SPX5_6 of the fifth pixel unit PXU5.

In the fifth pixel unit PXU5 of FIG. 8, the first, third, and fifth sub-pixels SPX5_1, SPX5_3, and SPX5_5 may be smaller in size than the second, fourth, and sixth sub-pixels SPX5_2, SPX5_4, and SPX5_6.

On the other hand, in the fifth pixel unit PXU5 of FIG. 10, the first, third, and fifth sub-pixels SPX5_1, SPX5_3, and SPX5_5 may be larger in size than the second, fourth, and sixth sub-pixels SPX5_2, SPX5_4, and SPX5_6. That is, the fifth pixel unit PXU5 may have the same structure as first, second, third, and fourth pixel units PXU1, PXU2, PXU3, and PXU4 except for the types and arrangement of color filters therein. In this case, the manufacturing process of a display device can be simplified, and the manufacturing cost of a display device can be reduced.

The colors displayed by pixels have been described above as being red, green, blue, and white colors, but the present disclosure is not limited thereto. That is, an image can be displayed using, for example, cyan, magenta, yellow, and white colors.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A video wall-type display device comprising:
    a plurality of display modules, each of the display modules comprising:
        a display area comprising:
            a first sub-area comprising at least one first pixel unit; and
            at least one second sub-area disposed to adjoin and to surround the first sub-area, the at least one second sub-area comprising at least one second pixel unit, a first gate line extending in a first direction, and a second gate line extending in the first direction; and
        a non-display area disposed to surround the display area,
    wherein each of the at least one first pixel unit and the at least one second pixel unit comprises:
        a first pixel configured to display a first color;
        a second pixel configured to display a second color; and
        a third pixel configured to display a third colors, the first, second, and third colors being different from each another,
    wherein the at least one second pixel unit further comprises:

a fourth pixel, a fifth pixel, and a sixth pixel, each of the fourth pixel, the fifth pixel, and the sixth pixel being configured to display a white color,
wherein the fourth pixel of the at least one second pixel unit, the fifth pixel of the at least one second pixel unit and the sixth pixel of the at least one second pixel unit are sequentially arranged in the first direction,
wherein the first pixel of the at least one second pixel unit, the second pixel of the at least one second pixel unit and the third pixel of the at least one second pixel unit are electrically connected to the first gate line,
wherein the fourth pixel of the at least one second pixel unit, the fifth pixel of the at least one second pixel unit and the third pixel of the at least one second pixel unit are electrically connected to the second gate line, and
wherein the second gate line is disposed between the non-display area and the first gate line in a second direction perpendicular to the first direction.

2. The video wall-type display device of claim 1, wherein the at least one fourth pixel of the at least one second pixel unit is disposed to adjoin the non-display area.

3. The video wall-type display device of claim 2, wherein the at least one fourth pixel of the at least one second pixel unit is disposed between the first pixel, the second pixel, and the third pixel of the at least one second pixel unit and the non-display area.

4. The video wall-type display device of claim 1, wherein each of the first pixel, the second pixel, and the third pixel of the at least one first pixel unit includes two sub-pixels, which display different brightness, respectively.

5. The video wall-type display device of claim 4, wherein the first pixel, the second pixel, and the third pixel of the at least one second pixel unit are configured to display the same brightness.

6. The video wall-type display device of claim 1, wherein the first color is a red color, the second color is a green color, and the third color is a blue color.

7. A video wall-type display device comprising:
a plurality of display modules, each of the display modules comprising:
a display area configured to display an image; and
a non-display area disposed to surround the display area,
wherein the display area comprises:
a first sub-area comprising at least one first pixel unit;
a second sub-area comprising at least one second pixel unit disposed to adjoin a lower side of the first sub-area, a first gate line extending in a first direction and a second gate line extending in the first direction;
a third sub-area comprising at least one third pixel unit disposed to adjoin a left side of the first sub-area;
a fourth sub-area comprising at least one fourth pixel unit disposed to adjoin a right side of the first sub-area; and
a fifth sub-area comprising at least one fifth pixel unit disposed to adjoin an upper side of the first sub-area,
wherein each of the at least one first pixel unit, the at least one second pixel unit, the at least one third pixel unit, the at least one fourth pixel unit, and the at least one fifth pixel unit comprises:
a first pixel configured to display a first color;
a second pixel configured to display a second color; and
a third pixel configured to display a third color, the first, second, and third colors being different from one another, and wherein each of the at least one second pixel unit, the at least one third pixel unit, the at least one fourth pixel unit, and the at least one fifth pixel unit further comprises:
a fourth pixel configured to display a white color,
wherein the at least one second pixel unit further comprises:
a fifth pixel and a sixth pixel, the fifth pixel and the sixth pixel being configured to display the white color,
wherein the fourth pixel of the at least one second pixel unit, the fifth pixel of the at least one second pixel unit and the sixth pixel of the at least one second pixel unit are sequentially arranged in the first direction,
wherein the first pixel of the at least one second pixel unit, the second pixel of the at least one second pixel unit and the third pixel of the at least one second pixel unit are electrically connected to the first gate line,
wherein the fourth pixel of the at least one second pixel unit, the fifth pixel of the at least one second pixel unit and the third pixel of the at least one second pixel unit are electrically connected to the second gate line, and
wherein the second gate line is disposed between the non-display area and the first gate line in a second direction perpendicular to the first direction.

8. The video wall-type display device of claim 7, wherein the at least one fourth pixel is disposed to adjoin a lower side of the second sub-area, a left side of the third sub-area, a right side of the fourth sub-area, and an upper side of the fifth sub-area.

9. The video wall-type display device of claim 8, wherein the first pixel, the second pixel, and the third pixel of the at least one first pixel unit are arranged in two rows and three columns, and
wherein the first pixel, the second pixel, the third pixel, and the fourth pixel of the at least one second pixel unit, the at least one third pixel unit, the at least one fourth pixel unit, and the at least one fifth pixel unit are arranged in two rows and three columns.

10. The video wall-type display device of claim 9, wherein the first pixel, the second pixel, and the third pixel of the at least one second pixel unit are sequentially arranged in a first row, and
wherein the at least one fourth pixel of the at least one second pixel unit is sequentially arranged in a second row.

11. The video wall-type display device of claim 10, wherein the at least one fourth pixel of the at least one second pixel unit has the same brightness as the first pixel, the second pixel, and the third pixel disposed in their respective columns.

12. The video wall-type display device of claim 9, wherein the at least one third pixel unit, the at least one fourth pixel of the at least one third pixel unit is sequentially disposed in a first column, and
wherein the first pixel, the second pixel, and the third pixel of the at least one third pixel unit are disposed in second and third columns.

13. The video wall-type display device of claim 9, wherein the at least one fourth pixel of the at least one third pixel unit has the same brightness as the first pixel, the second pixel, and the third pixel adjoined to them in their respective rows.

14. The video wall-type display device of claim 9, wherein the first pixel, the second pixel, and the third pixel of the at least one fourth pixel unit are disposed in first and second columns, and wherein the at least one fourth pixel of the at least one fourth pixel unit is sequentially disposed in a third column.

15. The video wall-type display device of claim 9, wherein the at least one fourth pixel of the at least one fifth pixel unit is sequentially disposed in a first row, and
wherein the first pixel, the second pixel, and the third pixel of the at least one fifth pixel unit are disposed in a second row.

16. The video wall-type display device of claim 9, wherein areas occupied by the first pixel, the second pixel, the third pixel, and the fourth pixel disposed in a first row of each of the at least one first pixel unit, the at least one second pixel unit, the at least one third pixel unit, and the at least one fourth pixel unit are larger than areas occupied by the first pixel, the second pixel, the third pixel, and the fourth pixel disposed in a second row of each of the at least one first pixel unit, the at least one second pixel unit, the at least one third pixel unit, and the at least one fourth pixel unit, respectively.

17. The video wall-type display device of claim 16, wherein areas occupied by the first pixel, the second pixel, the third pixel, and the fourth pixel disposed in the first row of the at least one fifth pixel unit are smaller than areas occupied by the first pixel, the second pixel, the third pixel, and the fourth pixel disposed in the second row of the at least one fifth pixel unit, respectively.

18. The video wall-type display device of claim 7, wherein each of the first pixel, the second pixel, and the third pixel of the at least one first pixel unit includes two sub-pixels, which display different brightness.

19. The video wall-type display device of claim 18, wherein each of the first pixel, the second pixel, and the third pixel of each of the at least one second pixel unit, the at least one third pixel unit, the at least one fourth pixel unit, and the at least one fifth pixel unit comprises at least one sub-pixel, which displays a single brightness.

20. The video wall-type display device of claim 7, wherein the first color is a red color, the second color is a green color, and the third color is a blue color.

21. The video wall-type display device of claim 1, wherein the at least one first pixel unit does not include a pixel configured to display the white color, and wherein any portion of the least one fourth pixel is not disposed in the non-display area.

22. The video wall-type display device of claim 7, wherein the at least one first pixel unit does not include a pixel configured to display the white color, and wherein any portion of the at least one fourth pixel is not disposed in the non-display area.

* * * * *